Figure 3:
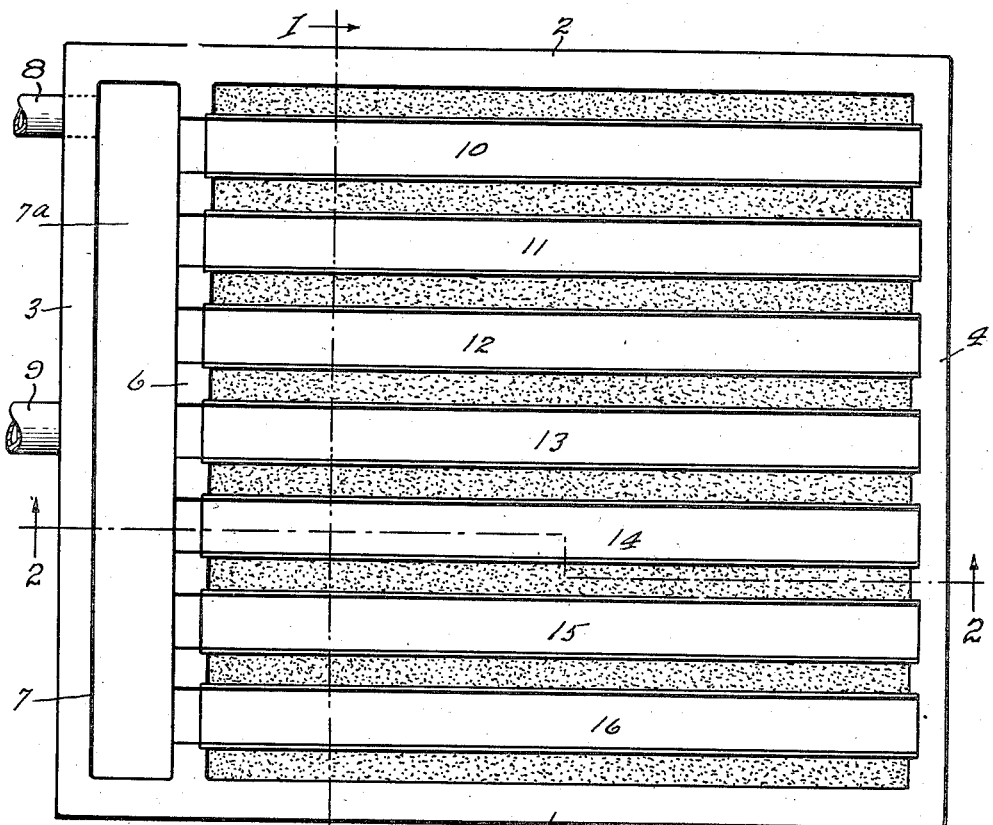

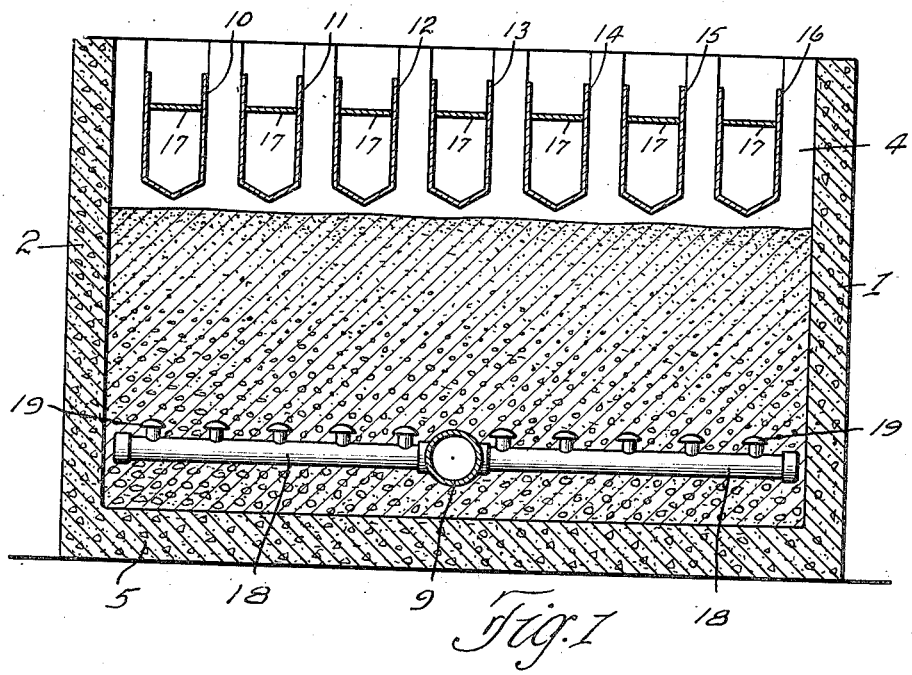
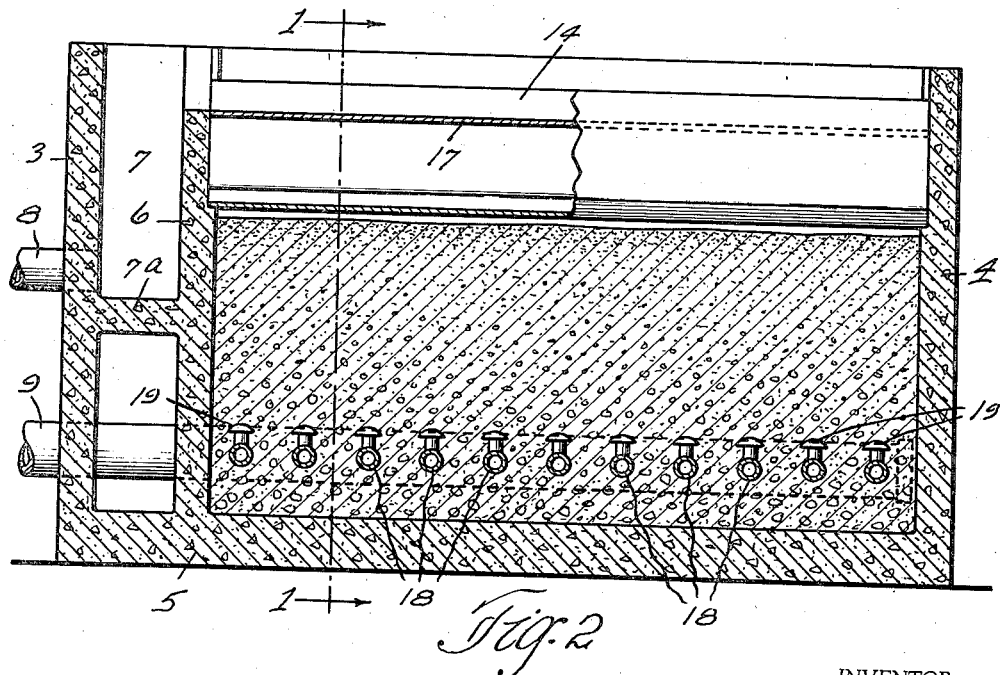

June 3, 1941.  H. M. DANNER  2,244,188
FILTER
Filed Nov. 13, 1937   2 Sheets-Sheet 2

INVENTOR.
Harry M. Danner
BY Hull, Birch & West
ATTORNEY.

Patented June 3, 1941

2,244,188

UNITED STATES PATENT OFFICE 2,244,188

FILTER

Harry M. Danner, Euclid, Ohio

Application November 13, 1937, Serial No. 174,334

3 Claims. (Cl. 210—130)

This invention relates to an apparatus which is particularly adapted for use in filtering water in large quantities such as in a municipal water system.

One of the main objects of the invention is to provide means for facilitating the cleansing of the filtering material which is necessary at intervals.

The usual filter generally consists of a filter bed made up of various sizes of gravel and sand which have been more or less thoroughly graded, the coarser particles being at the bottom and the finer particles being disposed at the top, the whole constituting the filter bed. In the normal operation of the filter, the water or material to be filtered is led into the top of the filter and flows downwardly therethrough either by gravity or under pressure. In the filtering action, the material removed from the water usually collects on the top of the fine layer of sand. The material adhering to the sand which is usually in the form of coagulated matter must be periodically removed which is done by reversing the flow of water through the filter in which case the water is caused to enter the bottom of the filter and to flow upwardly, slightly expanding all grades of filter media and causes a turbulence on top of the sand bed. It is desirable that all or nearly all of the coagulated matter should be carried away from the filter by the wash water. If any substantial amount of this coagulated matter is left on top of the filter bed, there is a tendency for it to agglomerate into large masses of such size that they cannot be carried away by the wash water. These large agglomerate masses are known as mud balls and one of the objects of this invention is to prevent the accumulation of mud balls.

The use of rapid rates of washing tends to lift the sand higher than if the washing is done at a lower rate. When the water is forced through the filter in the reversed direction at a high rate, the spaces between the sand particles are increased and less attrition between the sand grains is obtained so that there is less tendency for the sand particles to clean themselves of adhering coagulating matter than where a lower rate of washing is used.

Another object of my invention is to cause each unit volume of wash water to carry away with it the largest possible amount of impurities caught by the filter while filtering, thereby reducing the quantity of wash water required to clean the filter and reducing the cost of washing.

I provide means for causing the sand particles and the impurities caught by the filter which are floated and separated by the upward rush of the wash water while washing to be brought together and made to grind against each other and against baffles provided above the top layer of the filter so that any agglomeration of impurities is prevented or broken up and the sand particles are scoured of adhering impurities and subjected to a scrubbing action, the impurities being disintegrated and broken up and later carried away to the sewer by the wash water while the sand is cleaned and retained in the filter.

When the wash water flowing through the filter bed in the reverse direction reaches the top layer of sand, there is a tremendous decrease in the velocity of water flowing upwardly after it emerges from the sand because the sand grains take up space and the water flows faster while traveling through the sand than it does after it leaves the sand. In my construction, means are provided which are disposed above the normal level of the filter bed for preventing a material decrease in the velocity of the wash water as it leaves the top of the filter bed and for subjecting the top layer of sand to a scrubbing action. This means consists essentially of a plurality of troughs which provide for the escape of the wash water, the underside of the troughs being tapered and disposed immediately adjacent the layer of sand. The troughs are of such size and so arranged that the cross sectional area of the space between the troughs will be substantially equal to the cross sectional area of voids in the filter bed so that there is no substantial decrease in the velocity of the wash water as it leaves the filter bed.

Another object of the invention is to provide a filter of the character described having the features hereinbefore mentioned and which can be constructed at a minimum cost.

Figure 4:
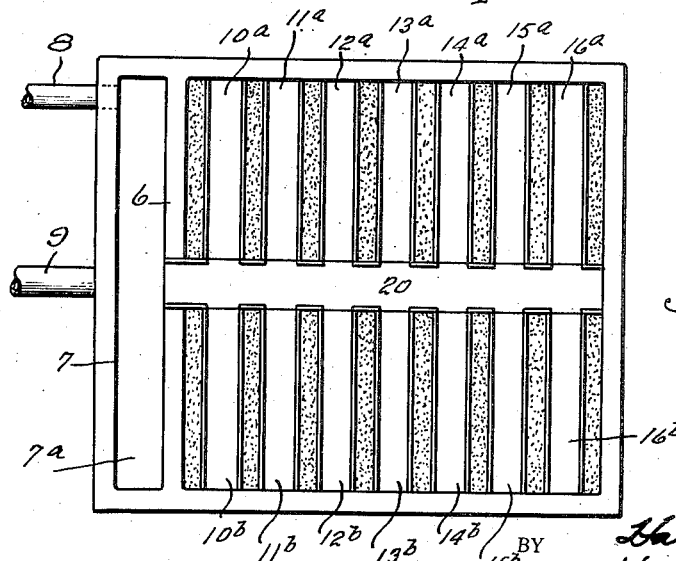

Further and more limited objects of the invention will appear as the description proceeds and by reference to the accompanying drawings in which Fig. 1 is a vertical sectional view on the line 1—1 of Figs. 1 and 2; Fig. 2 is a vertical sectional view on the line 2—2 of Fig. 3; Fig. 3 is a top plan view and Fig. 4 is a top plan view of a modified form of apparatus.

Referring now to the drawings and particularly to the embodiment shown in Figs. 1, 2 and 3, I have disclosed a rectangular filter having side walls 1 and 2 and end walls 3 and 4 and a bottom wall 5. Spaced inwardly of the wall 3 and extending parallel thereto is a wall or partition 6 which forms a compartment 7 having a bottom wall 7ª. The filter walls preferably are formed of concrete. Leading into the chamber 7 is a water inlet pipe 8 which is connected with any suitable source of water supply. Leading from the filter is a pipe 9 through which the filter water escapes. The filter bed is of usual construction and consists of various sizes of such material as sand, gravel and stone arranged in layers of different sizes, the coarser particles being at the bottom and the finer particles being at the top. The filter bed is employed as a support for the bridging action of coagulated matter carried by the water to be filtered. The coagulated matter, being coarser than the interstices between the sand particles, bridges the interstices and forms a strainer, much finer than the interstices of the sand bed itself, which retains additional coagulated matter and other impurities. The water passing through this mineral screen is filtered and purified and as it is continually bringing aditional coagulated matter to the filter, which is deposited thereon, the thickness of the porous filtering medium is being constantly increased. With increasing thickness of this layer comes an increasing resistance to the passage of water through it until eventually the resistance becomes too great to be overcome economically. It is then necessary that the filter be washed and it is desirable that all or nearly all of the coagulated matter be carried away from the filter by the wash water and it is important that if any coagulated matter is not carried away it should remain on the surface of the sand so that it will be carried away in the next washing operation.

Disposed within the filter and extending across the top thereof are a plurality of troughs 10, 11, 12, 13, 14, 15 and 16 which are supported in notches provided in the opposite walls and which are shaped in section as shown most clearly in Fig. 1. The troughs extend downwardly a considerable distance and the lower ends thereof are preferably V-shaped or slightly tapered, the purpose of which will hereinafter appear. Each trough has therein a bottom member 17 which is disposed at about the level with the top edge of the wall 6. Disposed within the filter and near the bottom thereof is a manifold 18 having thereon a plurality of strainer heads which are shown as mushroom shape. The coagulated water to be filtered is delivered through the pipe 8 into the chamber 7 from which it flows into the troughs and overflows from the trough and passes downwardly through the filter bed. It is then drawn off through the pipe 9 and delivered to its destination, such as a clear water reservoir from which it may be delivered to a distant point or distributed as desired. The coagulated matter and other impurities are filtered out and deposited on the top layer of sand. As this layer increases in thickness, the resistance to the passage of water through the filter increases and the time comes when the filter bed must be washed to remove the coagulated matter. To wash the filter, the flow therethrough is reversed, that is to say, the water is delivered to the filter through the pipe 9 preferably at the rate of from five to eight gallons per minute per square foot of filter area depending upon the nature of the impurities to be removed. Under this upward rush of water, the sand bed lifts and liquefies in a well known manner. This action will result in carrying away any of the impurities if they be in a finely divided state, but if they be agglomerate into a mass of considerable size, the washing is not properly done and the mass of impurities thus agglomerated are retained in the filter. These masses of agglomerated material are called mud balls and when first formed they are quite small but by accretion they grow into larger masses of considerable size which may be broken up in the first stages but become more resistive as they grow in size.

The wash water lifting and liquefying the sand bed carries these mud balls up with it but not sufficiently high to allow the mud balls to enter the wash trough to be removed of it this does occur a great quantity of sand is carried away along with the mud balls and wasted. The troughs are of such size and so disposed and arranged that the cross sectional area of the space between the troughs will be substantially equal to the cross sectional area of the voids in the filter bed so that there will not be any material decrease in the velocity of the wash water as it leaves the top of the filter bed. The lower ends of the troughs are disposed in close proximity to the top of the layer of sand and the sand and any impurities or agglomerated masses are subjected to a scouring action. The impurities are disintegrated into very small particles that may readily be carried away to the sewer with the wash water while the sand, being heavier, will be retained in the filter.

As the wash water rises in the filter, it overflows over the top of the troughs and flows outwardly into the compartment 7 from which it is withdrawn through the pipe 8. The disintegration of the mud, silt and other impurities into exceedingly small particles enables the wash water at a considerably decreased velocity to lift and carry the same upwardly to the top and into the wash troughs with a substantially less quantity of wash water. I have found that I am able to effectively clean the filter bed by delivering the wash water to the filter at a rate of five to eight gallons per minute per square foot of filter area. The troughs being arranged as shown provide restricted passageways through which the wash water flows without any material decrease in velocity as it reaches the top of the filter bed so that considerable turbulence is created at the top of the filter bed resulting in a thorough cleaning action without any material loss of sand and with a substantially less quantity of wash water.

In Fig. 4 I have disclosed a slightly modified form of my invention which is identical with that shown in Figs. 1 to 3 inclusive except that the troughs are differently arranged. In this embodiment of the invention I provide a single centrally disposed trough 20 which communicates with the chamber 7 at one end and disposed at each side of the trough 20 are troughs 10ª, 11ª, 12ª, 13ª, 14ª, 15ª and 16ª and 10ᵇ, 11ᵇ, 12ᵇ, 13ᵇ, 14ᵇ, 15ᵇ and 16ᵇ which deliver into the troughs 20 and are supported in any suitable manner. The function and operation of the troughs is the same as described in connection with the embodiment of the invention described in connection with Figs. 1 to 3, inclusive.

It will now be clear that I have provided a filter which will accomplish the objects of the invention as hereinbefore stated. It is to be understood that various changes may be made in the details of construction and arrangement of parts without departing from the spirit of my invention and that the embodiments of the invention herein disclosed are to be considered merely illustrative and not in a limiting sense. It is preferred that the troughs be of such size and so disposed and arranged that the cross sectional area of the passageway therebetween shall be approximately equal to the cross sectional area of the voids in the filter bed, although that proportion need not be strictly adhered to but it is desirable that the relationship be such that there will be no material decrease in velocity of the wash water as it reaches the top of the filter bed.

Having thus described my invention, what I claim is:

1. A filter having a filter bed the top surface of which includes finely divided mineral material, means disposed adjacent the normal level of the filter bed for causing the particles of filtering material to be subjected to a scrubbing action upon reverse flow of wash water through the filter, such means including a plurality of troughs disposed closely adjacent each other and serving to convey wash water from the filter and having their lower ends projecting downwardly immediately adjacent the top level of the filter bed, the space between such troughs being of such area and size as to provide restricted passageways through which the water flows without any substantial change in its velocity as it leaves the filter bed, the cross sectional area of the space between said troughs being substantially equal to the cross sectional area of the voids in the filter bed whereby wash water will pass through substantially all parts of the filter bed at substantially the same velocity.

2. In a filter, the combination of a filter bed having a top layer of sand or like material disposed below the top of the filter, means for delivering wash water in a reverse direction through said filter bed in such a manner that it carries upwardly with it particles of the filter bed, means disposed above and in close proximity to the normal level of the filter bed for preventing a material decrease in the velocity of the wash water as it leaves the top of the filter bed and for subjecting the top layer of sand to a scrubbing action, such means comprising a plurality of troughs for the escape of the wash water, the under sides of said troughs being tapered and disposed adjacent the layer of sand, the cross sectional area of the space between said troughs being substantially equal to the cross sectional area of the voids in the filter bed whereby wash water will pass through substantially all parts of the filter bed at substantially the same velocity.

3. A filter having a filter bed the top surface of which consists of finely divided mineral material, means disposed above the normal filtering bed for causing the particles of the top layer of filtering material to be subjected to a scrubbing action upon reverse flow through the filter, such means including a plurality of baffles of such size and area and so spaced and disposed as to provide a plurality of restricted passageways through which the wash water will flow, the cross sectional area of the space between said baffles being substantially equal to the cross sectional area of the voids in the filter bed whereby wash water will pass through substantially all parts of the filter bed at substantially the same velocity and without any substantial change in its velocity as it leaves the filter bed, such baffles being in the form of troughs the lower ends of which are generally V-shaped and the upper faces of which are shaped to provide conduits for the escape of wash water.

HARRY M. DANNER.